United States Patent Office 3,729,490
Patented Apr. 24, 1973

3,729,490
1-PHENYL-3-PHTHALANCARBOXYLIC ACIDS
AND INTERMEDIATES THEREOF
Francis J. Petracek, Bloomington, and Nobuyuki Sugisaka, New Brighton, Minn., assignors to Riker Laboratories, Inc., Northridge, Calif.
No Drawing. Continuation-in-part of abandoned application Ser. No. 72,232, Sept. 14, 1970, which is a division of application Ser. No. 780,168, Nov. 29, 1968, now Patent No. 3,557,147, dated Jan. 19, 1971. This application June 21, 1972, Ser. No. 264,881
Int. Cl. C07d 7/24
U.S. Cl. 260—343.2 R                                     8 Claims

ABSTRACT OF THE DISCLOSURE

Optionally substituted 1,4-dihydro - 1 - phenyl - 3H - 2-benzopyran-3-one, 4-bromo - 1,4 - dihydro - 1 - phenyl-3H-2-benzopyran - 3 - one and 4-chloro - 1,4 - dihydro-1-phenyl-3H-2-benzopyran-3-one intermediates are useful for the synthesis of pharmacologically active compounds.

This application is a continuation-in-part of U.S. patent application Ser. No. 72,232, filed Sept. 14, 1970, now abandoned, which is a division of application Ser. No. 780,168, filed Nov. 29, 1968, now U.S. Pat. 3,557,147, issued Jan. 19, 1971.

This invention relates to compounds classified as benzopyran-3-ones.

More particularly, the invention relates to chemical compounds wherein there is attached to the 1,4-dihydro-3H-2-benzopyran-3-one nucleus at the 1-position a phenyl radical and optionally at the 4-position a halogen.

The compounds of the present invention are useful for the synthesis of 1-phenylphthalan-3-carboxylic acids, said acids being described in U.S. Pat. No. 3,557,147. The acids are pharmacologically active, and are intermediates for the preparation of 1-phenyl-3-phthalamethylamines disclosed and claimed in U.S. Pat. 3,471,519, entitled "Substituted Phthalans and Intermediates."

The compounds of this invention are useful in the preparation of the acids (and thence the amines) noted hereinabove by means of the reaction sequence hereinafter disclosed.

The following reaction sequence is illustrative of the preparation of the compounds of this invention, which are the compounds of Formulas I, II and III. The preparation of the acids (IV) of U.S. Pat. 3,557,147 is included to illustrate the utilization of the compounds of the present invention:

wherein $R^1$ and $R^2$ are independently hydrogen, halogen, trifluoromethyl, lower alkyl and lower alkoxy.

Presently preferred are compounds of the invention wherein $R^1$ and $R^2$ are both hydrogen and compounds of the invention wherein $R^1$ is para-chloro or para-fluoro, and $R^2$ is hydrogen.

The starting materials for the preparation of the compounds of this invention are 2-benzoylphenylacetic acids that are conveniently prepared, for example, as described by S. Nizamuddin et al., J. Indian Chem. Soc., 42 (8):569–70 (1965), from 1-phenylindan-1-ol or substituted 1-phenylindan-1-ols by treatment with chromium trioxide in the presence of acetic acid.

The 4-bromo- and 4-chloro-1,4-dihydro-1-phenyl-3H-2-benzopyran-3-one compounds are capable of existing both as trans- and cis-isomers. Both isomeric forms are included within the scope of this invention.

As described in the reaction sequence depicted above, the starting material is converted to the 1,4-dihydro-1-phenyl-3H-2-benzopyran-3-one (I) compound of the invention by means of a two-step reaction in which the carbonyl function of the benzoyl moiety is first reduced and then lactone formation is induced by acid catalysis. The two steps in the reaction are carried out consecutively without isolation of the reduction product. The reduction is carried out in aqueous base, using a reducing agent, preferably a borohydride, for example, sodium borohydride, potassium borohydride and the like. After reduction is completed, the reaction product is treated with a mineral acid, for example, hydrochloric acid, which decomposes the excess borohydride reducing agent and brings about lactone formation, to yield the 1,4-dihydro-1-phenyl-3H-2-benzopyran-3-one.

The 1,4-dihydro-1-phenyl-3H-2-benzopyran-3-one is converted to the compound of Formula II or III by bromination or chlorination, respectively, for example with an equimolar ratio of bromine in the presence of an inert solvent such as carbon tetrachloride or chlorination in an inert solvent. The reaction is carried out at a suitable temperature, for example, the reflux temperature of the solvent used, and the 4-halo-1,4-dihydro-1-phenyl-3H-2-benzopyran-3-one intermediate is obtained by conventional techniques of isolation and purification.

If a compound of Formula II is obtained, it may be converted to a compound of Formula III by halogen exchange, for example, by refluxing with hydrochloric acid in the presence of a suitable solvent such as isopropanol. The chlorolactone product of the reaction may, if de-

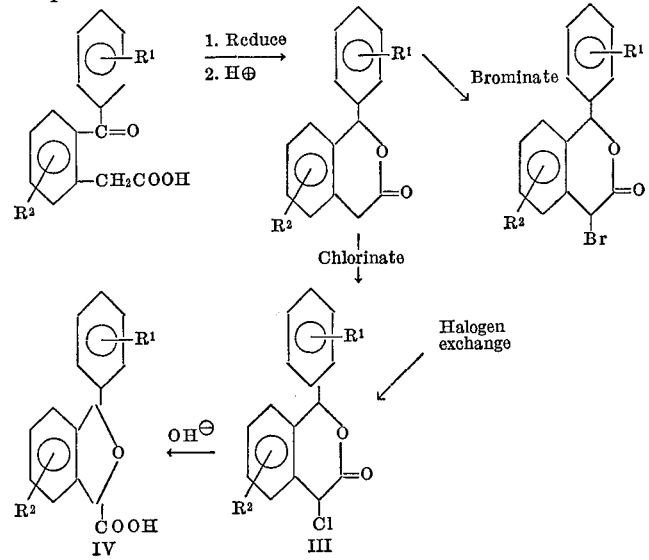

sired, be isolated, but it can be used without further purification in the next step of the reaction sequence.

The 1-phenyl-3-phthalancarboxylic acid compounds (IV) of the art are prepared from the 4-chloro-1,4-dihydro-1-phenyl-3H-2-benzopyran-3-ones of the invention by reaction with a strong base such as sodium hydroxide, the reaction being carried out at room temperature. The product is recovered by conventional techniques of isolation and purification.

The following examples illustrate the preparation of compounds of the invention but are not intended to be limiting thereof.

EXAMPLE 1

(a) 1,4-dihydro-1-phenyl-3H-2-benzopyran-3-one

To 2-benzoylphenylacetic acid (10 g., 0.041 mole) dissolved in dilute sodium hydroxide (100 ml.) was added, with stirring, solid sodium borohydride (1.6 g.). After stirring for two hours at room temperature, ice was added to the mixture, and the excess sodium borohydride was decomposed by the addition of 6 N of hydrochloric acid to pH 1. The resulting oil was extracted with diethyl ether (300 ml.). In order to promote lactone formation, the ether layer was not washed free of acid. The ether extract was evaporated in vacuo to an oil. The product, M.P. 73–74° C., was recrystallized from ethanol after initial crystallization from ethanol/water.

*Analysis.*—Calculated for $C_{15}H_{12}O_2$ (percent): C, 80.33; H, 5.39. Found (percent): C, 80.18; H, 5.49.

(b) 4-bromo-1,4-dihydro-1-phenyl-3H-2-benzopyran-3-one

To the lactone (4.5 g., 0.02 mole) dissolved in carbon tetrachloride (25 ml.) at room temperature was added all at once an equimolar ratio (1 ml.) of bromine. The reaction mixture was refluxed for 20 minutes, at which time hydrogen bromide evolution ceased. The solution was evaporated to a viscous oil from which the product, M.P. 98–103° C., was crystallized from methanol.

*Analysis.*—Calculated for $C_{15}H_{11}BrO_2$ (percent): C, 59.42; H, 3.65; O, 10.55. Found (percent): C, 57.70; H, 3.77; O, 10.45.

(c) 4-chloro-1,4-dihydro-1-phenyl-3H-2-benzopyran-3-one

A mixture of the bromolactone (6.7 g., 0.022 mole), 6 N hydrochloric acid (35 ml.) and isopropanol (70 ml.) was refluxed for one hour. Evaporation to near dryness and extraction with diethyl ether, followed by evaporation in vacuo, gave 5.7 g. of a brown oil which was used in the next step of the reaction sequence without further purification or isolation. Preferably the ether extracts are used for the next step of the reaction sequence without concentration.

(d) 1-phenyl-3-phthalancarboxylic acid

The crude chlorolactone before evaporation of the ether from step (c) is treated by stirring with 6 N sodium hydroxide (50 ml.) for 30 minutes at room temperature. The reaction mixture is then diluted with water, and the resulting basified water layer is acidified with 6 N hydrochloric acid. The crystalline acid product, M.P. 149–157° C., was recovered by filtration. Recrystallization from chloroform gave white needles, M.P. 166–170° C.

*Analysis.*—Calculated for $C_{15}H_{12}O_3$ (percent): C, 74.99; H, 5.03. Found (percent): C, 74.76; H, 5.06.

EXAMPLE 2

(a) 1-(4-chlorophenyl)-1,4-dihydro-3H-2-benzopyran-3-one

To a mixture of 2-(4-chlorobenzoyl)phenylacetic acid (10.3 g., 0.375 mole) dissolved in dilute aqueous sodium hydroxide (750 ml.) was added dropwise, with stirring, a solution of sodium borohydride (0.52 mole) in 120 ml. of 50 percent sodium hydroxide. After stirring at room temperature for four hours the solution was cooled, then the excess sodium borohydride was decomposed with 270 ml. of concentrated hydrochloric acid. The clear supernatant was separated from the product, a greenish gum. The gum was dissolved in benzene, a trace of p-toluenesulfonic acid was added, and the solution was azeotroped for three hours. The solution was cooled and washed with aqueous sodium bicarbonate, then water. The benzene solution was dried, then the benzene was evaporated in vacuo to give the solid product which was recrystallized from aqueous ethanol to M.P. 90–92° C.

(b) 4-bromo-1-(4-chlorophenyl)-1,4-dihydro-3H-2-benzopyran-3-one

The compound was prepared according to the method of Example 1(b), using the compound of Example 2(a) as the starting material. The structural assignment was based on the method of synthesis and the infrared and proton magnetic resonance spectra.

(c) 4-chloro-1-(4-chlorophenyl)-1,4-dihydro-3H-2-benzopyran-3-one

The product of step 2(b) was converted by the method of Example 1(c) to an ether solution of the desired product. A small portion of the product was checked by its infrared spectrum for structural integrity. The product was used as an ether solution for the final reaction step.

(d) 1-(4-chlorophenyl)-3-phthalancarboxylic acid

The product of step 2(c) was converted to the desired product by the method of Example 1(d). Recrystallization from chloroform-hexane provided the product with M.P. 155–157° C.

The following table illustrates compounds of the present invention which are prepared for use as intermediates:

1,4-dihydro-1-(4-fluorophenyl)-3H-2-benzopyran-3-one,
4-bromo-1,4-dihydro-1-(4-fluorophenyl)-3H-2-benzopyran-3-one,
4-chloro-1,4-dihydro-1-(4-fluorophenyl)-3H-2-benzopyran-3-one,
1,4-dihydro-1-(2methyl-phenyl)-3H-2-benzopyran-3-one,
4-bromo-1,4-dihydro-1-(2-methylphenyl)-3H-2-benzopyran-3-one,
4-chloro-1,4-dihydro-1-(2-methylphenyl)-3H-2-benzopyran-3-one,
1,4-dihydro-1-(4-trifluoromethylphenyl)-3H-2-benzopyran-3-one,
4-bromo-1,4-dihydro-1-(4-trifluoromethylphenyl)-3H-2-benzopyran-3-one, and
4-chloro-1,4-dihydro-1-(4-trifluoromethylphenyl)-3H-2-benzopyran-3-one.

What is claimed is:
1. A compound of the formula

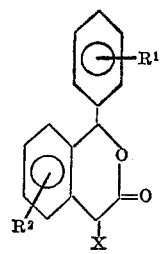

wherein $R^1$ and $R^2$ are independently hydrogen, halogen, trifluoromethyl, lower alkyl and lower alkoxy, and X is hydrogen, bromine or chlorine.

2. A compound according to claim 1 wherein $R^2$ is hydrogen.

3. A compound according to claim 2 wherein $R^1$ is hydrogen, chlorine or fluorine.

4. The compound 1-(4-chlorophenyl)-1,4-dihydro-3H-2-benzopyran-3-one according to claim 3.

5. The compound 4-bromo-1-(4-chlorophenyl)-1,4-dihydro-3H-2-benzopyran-3-one according to claim 3.

6. The compound 4-chloro-1-(4-chlorophenyl)-1,4-dihydro-3H-2-benzopyran-3-one according to claim 3.

7. The compound 1,4-dihydro-1-phenyl-3H-2-benzopyran-3-one according to claim 3.

8. The compounds 4-bromo-1,4-dihydro-1-phenyl-3H-2-benzopyran-3-one and 4-chloro-1,4-dihydro-1-phenyl-3H-2-benzopyran-3-one according to claim 3.

References Cited

UNITED STATES PATENTS 3,557,147   1/1971   Petracek et al. ____ 260—343.2

JOHN M. FORD, Primary Examiner

U.S. Cl. X.R.

260—346.2